Patented July 6, 1948

2,444,589

UNITED STATES PATENT OFFICE 2,444,589

PURIFICATION OF ORGANIC NITRILES

William A. Blann, Stamford, Conn., assignor to American Cyanamid Company, New York, N. Y., a corporation of Maine No Drawing. Application August 10, 1945,
Serial No. 610,190

4 Claims. (Cl. 260—465.6)

This invention relates to the purification of organic nitriles. More specifically the invention relates to the purification of acrylonitrile and hydracrylonitrile by the use of ion-exchange materials in conjunction with neutral purifying or decolorizing agents such as charcoal.

It can be generally stated that the production of organic nitriles is accompanied by the formation of a complexity of impurities in the form of ionic as well as neutral bodies. Upon a study of the procedures for the preparation of nitriles there is disclosed almost without exception a plurality of steps for the purification of the compounds which ultimately results in a loss of final yield of the product along with involving a considerable amount of time in effecting the purification.

In many instances it is essential that the nitriles be in as pure a state as possible in that even minute traces of impurities at times give rise to the formation of additional impurities. When the organic nitriles are to be used in the synthesis of other compounds it is also very desirable to have the nitriles in as pure a state as possible since impure reactants often are a cause for extremely low yields of the desired products in addition to resulting in more difficult isolation of the products. In numerous procedures organic nitriles are prepared by reacting inorganic cyanides with organic compounds and there often results a reaction product being contaminated with inorganic, organic and complex organic-inorganic impurities from which it is difficult to isolate the desired compound. The attempt to decolorize an impure organic nitrile by means of a decolorization agent such as charcoal is frequently defeated by the presence of colored or colorless ionic bodies in the solution. The ionic bodies, for example, inorganic salts, tend to stabilize the coloring bodies contained in the nitriles and thus conventional decolorizing agents fail to give a colorless product. The presence of ammonia or amines also hinders decolorization probably because of the fact that the amino compounds act as stable emulsifiers for the coloring bodies.

Purification processes such as distillation are in many cases undesirable due to the deleterious effects arising by the use of elevated temperatures. Nitriles, such as acrylonitrile, are unstable when subjected to elevated temperatures and as a result the yield of the desired product suffers considerably. Acrylonitrile undergoes polymerization at elevated temperatures with a consequent formation of tarry residues accompanied by a decreased yield. Still other nitriles such as hydracrylonitrile tend to undergo dehydration at elevated temperatures by splitting off a molecule of water from a molecule of the hydracrylonitrile to give undesirable products.

As mentioned previously, attempts to decolorize nitriles with such agents as charcoal sometimes bring about little or no results. It has been noticed that ion-exchange materials such as the zeolites and ion-exchange resins also often fail to bring about a purification of certain liquid nitriles.

An object of this invention is to provide a method for the purification of organic nitriles, particularly acrylonitrile and hydracrylonitrile.

Another object of this invention is to provide a method for the purification of acrylonitrile and hydracrylonitrile by the use of ion active materials in conjunction with conventional neutral decolorizing agents.

A further object of this invention is to effect a purification of heat-unstable nitriles by the removal of ionic and neutral bodies through the utilization of ion-active materials in conjunction with neutral decolorizing agents at normal room temperatures.

According to the present invention acrylonitrile and hydracrylonitrile can be efficiently and consistently isolated from organic, inorganic or complex organic-inorganic impurities by bringing the impure nitriles into intimate contact with ion-exchange materials and neutral decolorizing agents. It is preferable to effect the purification by passing the impure organic nitrile solutions through series of beds comprising a cation-active bed, an anion-active bed and a bed of a neutral decolorizing agent such as charcoal. In some cases it might be desirable to have a plurality of the beds mentioned and still in other cases it might be desirable to use one or more beds of a composite mixture of the purifying and decolorizing agents. Nitriles which are solids at room temperature may be dissolved in suitable solvents and thus passed through the purification mediums. It has been observed that nitriles which failed to respond to singular treatments with either decolorizing agents or ion-exchange materials readily became purified after a combined treatment with the purification agents disclosed herein.

After a purification process such nitriles as acrylonitrile are not stable over long periods of time in that polymerization gradually occurs at normal temperatures and more readily at elevated temperatures. It is therefore necessary to add agents to inhibit polymerization upon storage. The complete removal of the inhibitors is desired in many instances prior to subsequent polymerization processes. Such removal of the inhibitors is readily accomplished by the utilization of the process as herein described.

The process of the present invention not only makes it possible to obtain pure nitriles but also results in higher yields than those obtained by other methods. For example, purification by distillation almost invariably results in a decreased yield by accompanying decomposition and/or polymerization of the organic nitriles as evidenced by the tarry residues frequently found in the stills after the distillation has been completed.

The process of the present invention may also be applied to the purification of substituted acrylonitriles and hydracrylonitriles, for example such as, methacrylonitrile, chloracrylonitrile, methyl hydracrylonitrile, chloro hydracrylonitrile and the like.

Among the cation-active materials which are satisfactory for use in the present process are the phenol-formaldehyde condensation products, catechol - tannin - formaldehyde condensation products, aromatic sulfonic-formaldehyde condensation products prepared as described in U. S. Patent No. 2,204,539, the cation-active materials disclosed in U. S. Patent No. 2,372,233, carbonaceous zeolites such as sulfated or sulfonated carbonaceous materials some of which are coal, peat, wood and lignite.

Among the anion-active resins which may be satisfactorily employed are insoluble resins comprising the aldehyde condensation products of m-phenylene diamine, biguanide, guanyl urea, substituted guanidines, polyamines and the like. Some of the resins may be prepared in the manner disclosed in U. S. Patents Nos. 2,251,234 and 2,285,750 and as generally described in the literature.

Regeneration of spent cation-active materials may be accomplished by passing dilute aqueous acid solutions, having a concentration of about 0.1 to 10% by weight, through a bed containing the material and subsequently washing with water until the bed is substantially free of the acid used. Anion-active materials may be regenerated in a like manner by passing dilute aqueous alkaline solutions, having a concentration of about 0.1 to 10% by weight, through the anion bed followed by washing with water. Other concentrations of the acid or alkaline wash solutions may be used if desired. The washing steps may be also accomplished by suitable organic liquids such as ethanol, acetone and the like when the presence of water is objectionable.

Decolorizing agents other than charcoal may sometimes be used to advantage as for instance such agents as activated alumina, the oxides of magnesium, calcium or barium, talcum, fuller's earth, pumice, powdered glass, sand and the like. Some of the charcoal decolorizers suitable for use in the present invention are marketed under the trade names of "Nuchar," "Darco," "Norit," "Superfiltchar" and the like.

The following examples are given as a means of illustration and not in limitation. Various modifications may be made without departing from the spirit and scope of the present invention.

Example I

A purification system is set up in series comprising a cation bed, an anion bed and a charcoal bed. The volume of materials in each bed is 1000 cc. The cation bed contains a carbonaceous zeolite, which is a sulfonated carbonaceous material namely "Zeocarb." The anion bed consists of an anion-active resin which is a guanidine-urea-formaldehyde condensation product and can be prepared as described in U. S. Patent No. 2,285,750 by using urea in place of melamine. The charcoal bed contains a decolorizing charcoal marketed as "Darco."

About 7000 cc. of a 15% aqueous solution of crude hydracrylonitrile, having an odor of ammonia and amines and a deep brown muddy color is caused to flow through the beds at a rate of about 60 cc. per minute. The first portion of the effluent from the cation bed is lighter in color but the latter portion comes through with the original deep brown muddy color. Passage of the effluent from the cation bed through the anion bed results in no change of the dark color as it enters the charcoal bed. The final effluent from the latter bed is water-white.

Example II

About 6000 cc. of a 7% aqueous solution of purified acrylonitrile containing a polymerization inhibitor is passed through a purification system as described in Example I. The acrylonitrile thus obtained is subjected to polymerization and found to polymerize very readily indicating an effective removal of the inhibitor by passage through the purification system.

I claim:

1. A process for the purification of acrylonitriles and hydracrylonitriles which comprises removing ionic impurities contained therein by bringing the nitriles into intimate contact with at least one cation exchange material and at least one anion exchange material and then removing coloring bodies contained therein by bringing the partially purified nitriles into intimate contact with a neutral decolorizing body.

2. A process for the purification of acrylonitrile and hydracrylonitriles which comprises removing ionic impurities contained therein by passing the nitriles through a series of purifying beds including a bed of cation exchange material and a bed of anion exchange material and then removing coloring bodies contained therein by passing the partially purified nitriles through a bed of neutral decolorizing material.

3. A process for the purification of acrylonitrile which comprises removing ionic impurities contained therein by bringing the nitriles into intimate contact with at least one cation exchange material and at least one anion exchange material and then removing coloring bodies contained therein by bringing the partially purified nitriles into intimate contact with a neutral decolorizing body.

4. A process for the purification of hydracrylonitrile which comprises removing ionic impurities contained therein by bringing the nitriles into intimate contact with at least one cation exchange material and at least one anion exchange material and then removing coloring bodies contained therein by bringing the partially purified nitriles into intimate contact with a neutral decolorizing body.

WILLIAM A. BLANN.

REFERENCES CITED

The following references are of record in the file of this patent:

UNITED STATES PATENTS

| Number | Name | Date |
|---|---|---|
| 2,191,365 | Boyd | Feb. 20, 1940 |
| 2,191,853 | Holmes | Feb. 27, 1940 |
| 2,223,930 | Briessbach et al. | Dec. 3, 1940 |
| 2,230,641 | Findlay | Feb. 4, 1941 |
| 2,240,116 | Holmes | Apr. 29, 1941 |
| 2,301,669 | Richter | Nov. 10, 1942 |
| 2,341,907 | Cheetham et al. | Feb. 15, 1944 |

FOREIGN PATENTS

| Number | Country | Date |
|---|---|---|
| 805,092 | France | Nov. 10, 1936 |

OTHER REFERENCES

Bhatnager et al.: Jour. Indian Chem. Soc., vol. 13 (1936), pages 679–688.

Resinous Prod. et al. Jour. Ind. and Eng. Chem., page 51, adv. section, June 1942.